US012597611B2

(12) United States Patent
Shelekhin et al.

(10) Patent No.: US 12,597,611 B2
(45) Date of Patent: *Apr. 7, 2026

(54) CATHODE FOR AN ELECTROCHEMICAL CELL INCLUDING AT LEAST ONE CATHODE ADDITIVE

(71) Applicant: DURACELL U.S. OPERATIONS, INC., Wilmington, DE (US)

(72) Inventors: Alexander Boris Shelekhin, Ridgefield, CT (US); Freddy Arthur Barnabas, West Chester, OH (US)

(73) Assignee: DURACELL U.S. OPERATIONS, INC., Wilmington, DE (US)

( * ) Notice: Subject to any disclaimer, the term of this patent is extended or adjusted under 35 U.S.C. 154(b) by 1263 days.

This patent is subject to a terminal disclaimer.

(21) Appl. No.: 17/443,653

(22) Filed: Jul. 27, 2021

(65) Prior Publication Data

US 2021/0359307 A1 Nov. 18, 2021

Related U.S. Application Data

(63) Continuation of application No. 14/630,718, filed on Feb. 25, 2015, now Pat. No. 11,075,382.

(Continued)

(51) Int. Cl.

*H01M 4/62* (2006.01)

*H01M 6/04* (2006.01)

(Continued)

(52) U.S. Cl.

CPC ............. *H01M 4/62* (2013.01); *H01M 4/625* (2013.01); *H01M 6/045* (2013.01); *H01M 6/505* (2013.01);

(Continued)

(58) Field of Classification Search

CPC ......... H01M 2300/0014; H01M 6/045; H01M 6/04; H01M 4/50; H01M 4/52; H01M 4/62; H01M 4/625; H01M 4/54; H01M 6/505

See application file for complete search history.

(56) References Cited

U.S. PATENT DOCUMENTS 3,956,018 A 5/1976 Kozawa
4,298,506 A 11/1981 Przybyla et al.

(Continued)

FOREIGN PATENT DOCUMENTS

CN 1231523 A 10/1999
CN 101304086 A 11/2008

(Continued)

OTHER PUBLICATIONS

CN-102282700-A English Translation (Year: 2010).*

(Continued)

*Primary Examiner* — Stephen J Yanchuk

(74) *Attorney, Agent, or Firm* — MARSHALL, GERSTEIN & BORUN LLP; Andrew M. Lawrence

(57) ABSTRACT

The invention is directed towards a cathode. The cathode includes an electrochemically active cathode material and at least one cathode additive. The at least one cathode additive includes a head group and at least one hydrocarbon tail group. The head group includes at least one p-element atom that is bonded to a second p-element atom. The at least one p-element atom has an electronegativity and the second p-element atom has an electronegativity. The electronegativity of the at least one p-element atom is different from the electronegativity of the second p-element atom.

20 Claims, 2 Drawing Sheets

Related U.S. Application Data

(60) Provisional application No. 62/004,926, filed on May 30, 2014.

(51) Int. Cl.

| | |
|---|---|
| ***H01M 6/50*** | (2006.01) |
| *H01M 4/02* | (2006.01) |
| *H01M 4/50* | (2010.01) |
| *H01M 4/52* | (2010.01) |
| *H01M 4/54* | (2006.01) |

(52) U.S. Cl.

CPC ........ *H01M 2004/028* (2013.01); *H01M 4/50* (2013.01); *H01M 4/52* (2013.01); *H01M 4/54* (2013.01); *H01M 6/04* (2013.01); *H01M 2300/0014* (2013.01)

(56) References Cited

U.S. PATENT DOCUMENTS

| | | | |
|---|---|---|---|
| 5,707,761 | A | 1/1998 | Hayashi et al. |
| 5,919,588 | A | 7/1999 | Jose et al. |
| 6,277,801 | B1 | 8/2001 | Dahanayake et al. |
| 6,483,275 | B1 | 11/2002 | Nebrigic et al. |
| 6,858,349 | B1 | 2/2005 | Luo et al. |
| 7,169,497 | B2 | 1/2007 | Davis et al. |
| 7,632,605 | B2 | 12/2009 | Guo et al. |
| 8,377,149 | B2 | 2/2013 | Dopp et al. |
| 9,287,052 | B2 | 3/2016 | Yoshizaki et al. |
| 2002/0094480 | A1 | 7/2002 | Gan et al. |
| 2002/0136950 | A1 | 9/2002 | Gan et al. |
| 2003/0170534 | A1 | 9/2003 | Kim et al. |
| 2005/0244714 | A1 | 11/2005 | Zhu et al. |
| 2005/0277023 | A1 | 12/2005 | Marple et al. |
| 2006/0269845 | A1 | 11/2006 | Xu et al. |
| 2007/0231691 | A1 | 10/2007 | Abe et al. |
| 2007/0287070 | A1 | 12/2007 | Okumura et al. |
| 2008/0038630 | A1 | 2/2008 | Cheiky |
| 2008/0280209 | A1 | 11/2008 | Kato et al. |
| 2010/0221610 | A1 | 9/2010 | Daniel-Ivad |
| 2010/0266882 | A1 | 10/2010 | Igarashi et al. |
| 2010/0323245 | A1 | 12/2010 | Liang |
| 2011/0086252 | A1 | 4/2011 | Phillips |
| 2011/0088728 | A1 | 4/2011 | Sehgal et al. |
| 2011/0176255 | A1 | 7/2011 | Sasaki et al. |
| 2011/0223493 | A1 | 9/2011 | Christian et al. |
| 2012/0052402 | A1 | 3/2012 | Turek et al. |
| 2013/0171521 | A1 | 7/2013 | Sugimoto et al. |

FOREIGN PATENT DOCUMENTS

| | | | | | |
|---|---|---|---|---|---|
| CN | 101420029 | A | | 4/2009 | |
| CN | 101800337 | A | | 8/2010 | |
| CN | 102282700 | A | * | 12/2011 | ............. H01M 4/52 |
| CN | 102299389 | A | | 12/2011 | |
| EP | 0563394 | A1 | | 10/1993 | |
| EP | 2226627 | A1 | | 9/2010 | |
| JP | S62140367 | A | | 6/1987 | |
| JP | H1083810 | A | | 3/1998 | |
| JP | 2003-045433 | A | | 2/2003 | |
| JP | 2006228439 | A | | 8/2006 | |
| JP | 2013-089345 | A | | 5/2013 | |
| WO | WO-2009/063907 | A1 | | 5/2009 | |
| WO | WO-2010/035827 | A1 | | 4/2010 | |
| WO | WO-2013/018843 | A1 | | 2/2013 | |

OTHER PUBLICATIONS

Chinese Patent Application No. 201580028531.4, First Office Action, dated Dec. 14, 2018.

Chinese Patent Application No. 201580028531.4, Notification to Grant Patent Right for Invention (with allowed claims), issued Oct. 27, 2020.

European Patent Application No. 15725211.5, Communication pursuant to Article 94(3) EPC, dated May 7, 2019.

Japanese Patent Application No. 2016-568963, Decision to Grant (with allowed claims), dated Jan. 5, 2021.

Japanese Patent Application No. 2016-568963, Notification of Reason for Rejection, dated Jun. 18, 2019.

Japanese Patent Application No. 2016-568963, Notification of Reason for Rejection, mailed Jun. 2, 2020.

PCT International Search Report with Written Opinion in corresponding international application PCT/US2015/031333 dated Aug. 18, 2015.

* cited by examiner

CATHODE FOR AN ELECTROCHEMICAL CELL INCLUDING AT LEAST ONE CATHODE ADDITIVE

FIELD OF THE INVENTION

The invention relates to a cathode for an electrochemical cell and more specifically a cathode for an electrochemical cell including at least one cathode additive.

BACKGROUND OF THE INVENTION

Electrochemical cells, or batteries, are commonly used as electrical energy sources. A battery contains a negative electrode, typically called the anode, and a positive electrode, typically called the cathode. The anode contains an active material that can be oxidized. The cathode contains an active material that can be reduced. The anode active material is capable of reducing the cathode active material. A separator is disposed between the anode and the cathode. These components are disposed in a can, or housing, that is typically made from metal.

When a battery is used as an electrical energy source in an electronic device, electrical contact is made to the anode and the cathode, allowing electrons to flow through the device and permitting the respective oxidation and reduction reactions to occur to provide electrical power to the electronic device. An electrolyte is in contact with the anode and the cathode. The electrolyte contains ions that flow through the separator between the anode and cathode to maintain charge balance throughout the battery during discharge.

There is a growing need to make batteries that are better suited to power contemporary electronic devices such as toys; remote controls; audio devices; flashlights; digital cameras and peripheral photography equipment; electronic games; toothbrushes; radios; and clocks. To meet this need, batteries may include higher loading of anode and cathode active materials to provide increased capacity and service life. Batteries, however, also come in common sizes, such as the AA, AAA, AAAA, C, and D battery sizes, that have fixed external dimensions and constrained internal volumes. The ability to increase active material loading alone to achieve better performing batteries is thus limited.

The inclusion of an additive or combination of additives within the battery is another design feature that has been evaluated. For example, additives, such as surfactants, have been included within the battery to increase, for example, battery discharge performance. The inclusion of additives within batteries, however, is not without issue. The additive may, for example, be added at a relatively high weight percent due to poor solubility of the additive within the electrolyte of the battery in order to increase battery discharge performance. The additive may increase the surface tension and viscosity of the electrolyte and impede diffusion of the electrolyte within the solid structures of the cathode. In addition, the additive may detrimentally alter the bulk properties of the electrolyte, such as reducing the ionic conductivity of the electrolyte. Furthermore, the additive may lower the running voltage of the battery on discharge by absorbing on the surface of the cathode active materials.

There exists a need to provide at least one additive for use within the cathode of a battery that: has increased solubility within electrolyte solutions, including strongly alkaline electrolyte solutions; decreases electrolyte surface tension; improves electrolyte uptake within the cathode; and improves mass transport within the electrolyte of the battery. The battery including at least one such an additive will exhibit increased overall battery discharge performance, including power capability and service life.

SUMMARY OF THE INVENTION

In one embodiment, the invention is directed towards a cathode. The cathode includes an electrochemically active cathode material and at least one cathode additive. The at least one cathode additive includes a head group and at least one hydrocarbon tail group. The head group includes at least one p-element atom that is bonded to a second p-element atom. The at least one p-element atom has an electronegativity and the second p-element atom has an electronegativity. The electronegativity of the at least one p-element atom is different from the electronegativity of the second p-element atom.

In another embodiment, the invention is directed towards a battery. The battery includes a housing; an anode; a cathode; a separator between the anode and the cathode; and an electrolyte. The cathode includes an electrochemically active cathode material and at least one cathode additive. The at least one cathode additive includes a head group and at least one hydrocarbon tail group. The head group includes at least one p-element atom that is bonded to a second p-element atom. The at least one p-element atom has an electronegativity and the second p-element atom has an electronegativity. The electronegativity of the at least one p-element atom is different from the electronegativity of the second p-element atom.

BRIEF DESCRIPTION OF THE DRAWINGS

While the specification concludes with claims particularly pointing out and distinctly claiming the subject matter, which is regarded as forming the present invention, it is believed that the invention will be better understood from the following description taken in conjunction with the accompanying drawings.

DETAILED DESCRIPTION OF THE INVENTION

Electrochemical cells, or batteries, may be primary or secondary. Primary batteries are meant to be discharged, e.g., to exhaustion, only once and then discarded. Primary batteries are described, for example, in David Linden, Handbook of Batteries (McGraw-Hill, 4th ed. 2011). Secondary batteries are intended to be recharged. Secondary batteries may be discharged and recharged many times, e.g., more than fifty times, a hundred times, or more. Secondary batteries are described, for example, in David Linden, Handbook of Batteries (McGraw-Hill, 4th ed. 2011). Accordingly, batteries may include various electrochemical couples and electrolyte combinations. Although the description and examples provided herein are generally directed towards primary alkaline electrochemical cells, or batteries, it should be appreciated that the invention may apply to both primary and secondary batteries of either aqueous or nonaqueous systems. Both primary and secondary batteries of either aqueous or nonaqueous systems are thus within the scope of this application and the invention is not limited to any particular embodiment.

Figure 1:
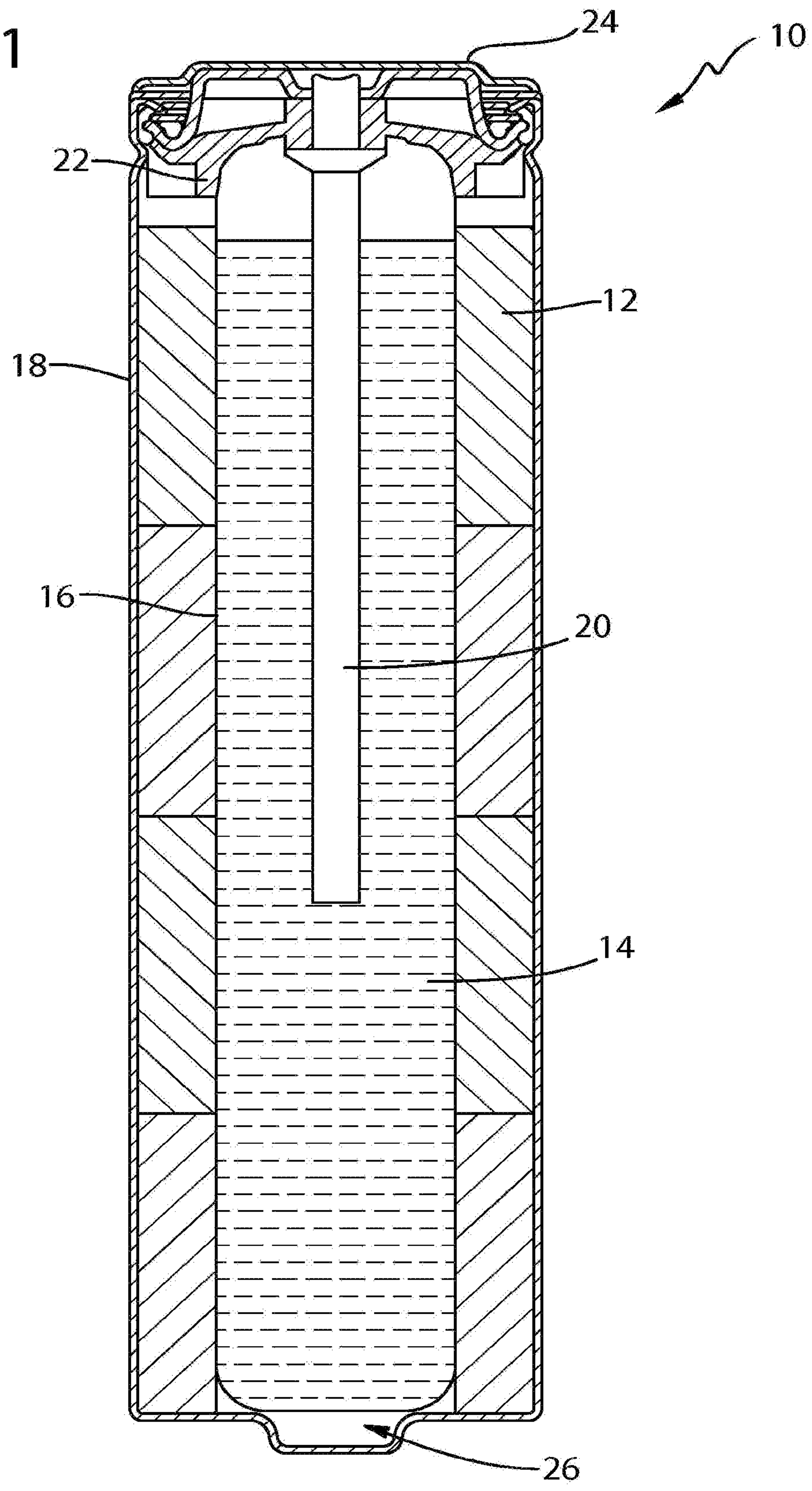
FIG. 1 is a cross-section of a primary alkaline battery of the present invention.

Referring to FIG. 1, there is shown a primary alkaline electrochemical cell, or battery, 10 including a cathode 12, an anode 14, a separator 16, and a housing 18. Battery 10 also includes current collector 20, seal 22, and an end cap 24. The end cap 24 serves as the negative terminal of the battery 10. A positive pip 26, which serves the positive terminal of the cell, is at the opposite end of the battery 10 from the end cap 24. An electrolytic solution is dispersed throughout the battery 10. The cathode 12, anode 14, separator 16, electrolyte, current collector 20, and seal 22 are contained within the housing 18. Battery 10 can be, for example, a AA, AAA, AAAA, C, or D alkaline battery.

The housing 18 can be of any conventional type of housing commonly used in primary alkaline batteries and can be made of any suitable material, for example cold-rolled steel or nickel-plated cold-rolled steel. The housing 18 may have a cylindrical shape—or may have any other suitable non-cylindrical shape, e.g., a prismatic shape for example, a shape comprising at least two parallel plates, such as a rectangular or square shape. The housing 18 may be, for example, deep-drawn from a sheet of the base material, such as cold-rolled steel or nickel-plated steel. The housing 18 may be, for example, drawn into a cylindrical shape. The finished housing 18 may have at least one open end. The finished housing 18 may have a closed end and an open end with a sidewall therebetween. The interior sidewall of the housing 18 may be treated with a material that provides a low electrical-contact resistance between the interior sidewall of the housing 18 and, for example, the cathode 12. The interior walls of the housing 18 may be plated, for example, with nickel, cobalt, and/or painted with a carbon-loaded paint to decrease contact resistance between the internal sidewall of the housing 18 and the cathode 12.

The cathode 12 includes one or more electrochemically active cathode materials. The electrochemically active cathode material may include manganese oxide, manganese dioxide, electrolytic manganese dioxide (EMD), chemical manganese dioxide (CMD), high power electrolytic manganese dioxide (HP EMD), lambda manganese dioxide, gamma manganese dioxide, beta manganese dioxide, and mixtures thereof. Other electrochemically active cathode materials include, but are not limited to, silver oxide; nickel oxide; nickel oxyhydroxide; copper oxide; copper salts, such as copper iodate; bismuth oxide; high-valence nickel compound; high-valence iron compound; oxygen; and mixtures thereof. The nickel oxide can include nickel hydroxide, nickel oxyhydroxide, cobalt oxyhydroxide-coated nickel oxyhydroxide, delithiated layered lithium nickel oxide, partially delithiated layered nickel oxide, and mixtures thereof. The nickel hydroxide or oxyhydroxide can include beta-nickel oxyhydroxide, gamma-nickel oxyhydroxide, and/or intergrowths of beta-nickel oxyhydroxide and/or gamma-nickel oxyhydroxide. The cobalt oxyhydroxide-coated nickel oxyhydroxide can include cobalt oxyhydroxide-coated beta-nickel oxyhydroxide, cobalt oxyhydroxide-coated gamma-nickel oxyhydroxide, and/or cobalt oxyhydroxide-coated intergrowths of beta-nickel oxyhydroxide and gamma-nickel oxyhydroxide. The high-valence nickel compound may, for example, include tetravalent nickel. The high-valence iron compound may, for example, include hexavalent iron.

The cathode 12 may include a conductive additive, such as carbon particles, and a binder. The carbon particles are included in the cathode to allow the electrons to flow through the cathode. The carbon particles may be graphite, such as expanded graphite and natural graphite; graphene, single-walled nanotubes, multi-walled nanotubes, carbon fibers; carbon nanofibers; and mixtures thereof. It is preferred that the amount of carbon particles in the cathode is relatively low, e.g., less than about 10%, less than about 7.0%, less than about 3.75%, or even less than about 3.5%, for example from about 2.0% to about 3.5%. The lower carbon level enables inclusion of a higher loading of electrochemically active material within the cathode 12 without increasing the volume of the cathode 12 or reducing the void volume of the finished battery 10 (which must be maintained at or above a certain level to prevent internal pressure from rising too high as gas is generated within the cell). Suitable expanded graphite may be, for example, BNB-90 graphite available from TIMCAL Carbon & Graphite (Bodio, Switzerland).

Examples of binders that may be used in the cathode 12 include polyethylene, polyacrylic acid, or a fluorocarbon resin, such as PVDF or PTFE. An example of a polyethylene binder is sold under the trade name COATHYLENE HA-1681 (available from Hoechst or DuPont). Examples of other cathode additives are described in, for example, U.S. Pat. Nos. 5,698,315, 5,919,598, 5,997,775 and 7,351,499.

The amount of electrochemically active cathode material within the cathode 12 may be referred to as the cathode loading. The loading of the cathode 12 may vary depending upon the electrochemically active cathode material used within, and the cell size of, the battery 10. For example, AA batteries with an EMD electrochemically active cathode material may have a cathode loading of at least about 9.0 grams of EMD. The cathode loading may be, for example, at least about 9.5 grams of EMD. The cathode loading may be, for example, from about 9.7 grams to about 11.5 grams of EMD. The cathode loading may be from about 9.7 grams to about 11.0 grams of EMD. The cathode loading may be from about 9.8 grams to about 11.2 grams of EMD. The cathode loading may be from about 9.9 grams to about 11.5 grams of EMD. The cathode loading may be from about 10.4 grams to about 11.5 grams of EMD. For a AAA battery, the cathode loading may be from about 4.0 grams to about 6.0 grams of EMD. For a AAAA battery, the cathode loading may be from about 2.0 grams to about 3.0 grams of EMD. For a C battery, the cathode loading may be from about 25.0 grams to about 29.0 grams of EMD. For a D battery, the cathode loading may be from about 54.0 grams to about 70.0 grams of EMD.

The cathode components, such as electrochemically active cathode material(s), carbon particles, and binder, may be combined with a liquid, such as an aqueous potassium hydroxide electrolyte; blended; and pressed into pellets for use in the manufacture of a finished battery. For optimal cathode pellet processing, it is generally preferred that the cathode material have a moisture level in the range of about 2.5% to about 5%, more preferably about 2.8% to about 4.6%. The pellets, after being placed within a housing during the battery manufacturing process, are typically re-compacted to form a uniform cathode.

It is generally preferred that the cathode 12 be substantially free of nonexpanded graphite. Nonexpanded graphite particles may provide lubricity to the cathode pellet forming equipment. Nonexpanded graphite, however, is significantly less conductive than expanded graphite and it may be necessary to use more nonexpanded graphite in order to obtain the same cathode conductivity of a cathode containing expanded graphite. While not preferred, the cathode may include low levels of unexpanded graphite; however this will compromise the reduction in graphite concentration that can be obtained while maintaining a particular cathode conductivity.

The cathode 12 will have a porosity that may be calculated at the time of cathode manufacture. The porosity of the cathode may be calculated at the time of manufacturing, for example after the cathode pellet processing, since the porosity of the cathode 12 within a battery 10 will change over time due to, inter alia, cathode swelling associated with electrolyte wetting of the cathode and battery discharge. The porosity of the cathode may be calculated as follows. The true density of each solid cathode component may be taken from a reference book, for example Lange's Handbook of Chemistry ($16^{th}$ ed. 2005). The solids weight of each of the cathode components are defined by the battery design. The solids weight of each cathode component may be divided by the true density of each cathode component to determine the cathode solids volume. The volume occupied by the cathode within the battery is defined, again, by the battery design. The volume occupied by the cathode may be calculated by a computer-aided design (CAD) program. The porosity may be determined by the following formula:

$$\text{Cathode Porosity}=[1-(\text{cathode solids volume}\pm\text{cathode volume})]\times 100$$

For example, the cathode 12 of a AA battery may include about 10.90 grams of manganese dioxide and about 0.401 grams of graphite (BNB-90) as solids within the cathode 12. The true densities of the manganese dioxide and graphite may be, respectively, about 4.45 g/cm$^3$ and about 2.15 g/cm$^3$. Dividing the weight of the solids by the respective true densities yields a volume occupied by the manganese dioxide of about 2.45 cm$^3$ and by the graphite of about 0.19 cm$^3$. The total solids volume is about 2.64 cm$^3$. The designer may select the volume occupied by the cathode 12 to be about 3.473 cm$^3$. Calculating the cathode porosity per the equation above [142.64 cm$^3$±3.473 cm$^3$)] yields a cathode porosity of about 0.24, or 24%. The cathode porosity may be from about 15% to about 45% and is preferably between about 22% and about 35%.

The anode 14 can be formed of at least one electrochemically active anode material, a gelling agent, and minor amounts of anode additives, such as organic and/or inorganic gassing inhibitor(s). The electrochemically active anode material may include zinc; zinc oxide; zinc hydroxide; cadmium; iron; alloys thereof; and mixtures thereof.

The amount of electrochemically active anode material within the anode 14 may be referred to as the anode loading. The loading of the anode 14 may vary depending upon the electrochemically active anode material used within, and the cell size of, the battery. For example, AA batteries with a zinc electrochemically active anode material may have an anode loading of at least about 3.3 grams of zinc. The anode loading may be, for example, at least about 4.0 grams, about 4.3 grams, about 4.6 grams, about 5.0 grams, or about 5.5 grams of zinc. The anode loading may be from about 4.0 grams to about 5.0 grams of zinc. The anode loading may be from about 4.2 grams to about 5.2 grams of zinc. AAA batteries, for example, with a zinc electrochemically active anode material may have an anode loading of at least about 1.9 grams of zinc. For example, the anode loading may be from about 2.0 grams to about 2.1 grams of zinc. AAAA batteries, for example, with a zinc electrochemically active anode material may have an anode loading of at least about 0.6 grams of zinc. For example, the anode loading may be from about 0.7 to about 1.0 grams of zinc. C batteries, for example, with a zinc electrochemically active anode material may have an anode loading of at least about 9.5 grams of zinc. For example, the anode loading may be from about 10.0 to about 15.0 grams of zinc. D batteries, for example, with a zinc electrochemically active anode material may have an anode loading of at least about 19.5 grams of zinc. For example, the anode loading may be from about 20.0 to about 30.0 grams of zinc.

Examples of a gelling agent that may be used include polyacrylic acid; polyacrylic acid cross-linked with polyalkenyl ether of divinyl glycol, such as Carbopol; grafted starch material; salt of a polyacrylic acid; carboxymethylcellulose; salt of a carboxymethylcellulose (e.g., sodium carboxymethylcellulose); or mixtures thereof. The anode may include a gassing inhibitor that may include an inorganic material, such as bismuth, tin, or indium. The gassing inhibitor can also include an organic compound, such as phosphate ester, ionic surfactant, nonionic surfactant, or amphoteric surfactant.

The electrolyte may be dispersed throughout the cathode 12, the anode 14 and the separator 16. The electrolyte comprises an ionically conductive component in an aqueous solution. The ionically conductive component may be a hydroxide. The hydroxide may be, for example, sodium hydroxide, potassium hydroxide, lithium hydroxide, cesium hydroxide, and mixtures thereof. The ionically conductive component may also include a salt. The salt may be, for example, zinc chloride, ammonium chloride, magnesium perchlorate, magnesium bromide, and mixtures thereof. The concentration of the ionically conductive component may be selected depending on the battery design and its desired performance. An aqueous alkaline electrolyte may include a hydroxide, as the ionically conductive component, in a solution with water. The concentration of the hydroxide within the electrolyte may be from about 0.25 to about 0.40, or from about 25% to about 40%, on a weight basis of the total electrolyte within the battery 10. For example, the hydroxide concentration of the electrolyte may be from about 0.25 to about 0.32, or from about 25% to about 32%, on a weight basis of the total electrolyte within the battery 10. The aqueous alkaline electrolyte may also include zinc oxide (ZnO) dissolved within it. The ZnO may serve to suppress zinc corrosion within the anode. The concentration of ZnO included within the electrolyte may be less than about 3% by weight of the total electrolyte within the battery 10. The ZnO concentration, for example, may be from about 1% by weight to about 3% by weight of the total electrolyte within the battery 10.

The total weight of the aqueous alkaline electrolyte within a AA alkaline battery, for example, may be from about 3.0 grams to about 4.0 grams. The total weight of the electrolyte within a AA battery preferably may be, for example, from about 3.3 grams to about 3.8 grams. The total weight of the electrolyte within a AA battery may be, for example, from about 3.4 grams to about 3.65 grams. The total weight of the aqueous alkaline electrolyte within a AAA alkaline battery, for example, may be from about 1.0 grams to about 2.0 grams. The total weight of the electrolyte within a AAA battery may be, for example, from about 1.2 grams to about 1.8 grams. The total weight of the electrolyte within a AAA battery may be, for example, from about 1.4 grams to about 1.6 grams.

The cathode 12 may include at least one cathode additive. The at least one cathode additive may be a compound that has a head group attached to a hydrocarbon tail group having from 4 to 10 carbon atoms. The head group may include at least one p-element atom that be bonded to a second p-element atom. The at least one p-element atom has an electronegativity and the second p-element atom has an electronegativity. The electronegativity of the at least one p-element atom may be different from the electronegativity of the second p-element atom. A p-element is an element that has at least one electron within a p-orbital, for example, boron (B), nitrogen (N), phosphorus (P), sulfur (S), carbon (C), and oxygen (O). The at least one cathode additive may be a compound that is a Bronsted-Lowrey acid. The at least one cathode additive may be a compound that is a Lewis acid.

The at least one cathode additive may be a compound that has a Lewis acid head group (hydrophilic moiety) attached to a hydrocarbon tail group (hydrophobic moiety) having from 4 to 10 carbon atoms. As used herein, a "Lewis acid" head group (1) is a fully classical Lewis acid and/or (2) contains a Lewis site due to electron deficiency. In the Lewis theory of acid-base reactions, bases donate pairs of electrons and acids accept pairs of electrons. A Lewis acid is therefore any entity, such as the H+ ion, that can accept a pair of nonbonding electrons. In other words, a fully classical Lewis acid is an electron-pair acceptor. Some molecules have electron-deficient bonds referred to as Lewis sites. Lewis sites occur when a molecule has too few valence electrons to form a stable octet structure. Examples of compounds that are electron deficient are the boranes, which are often described as having 3-center-2-electron bonds. Such species readily react with Lewis bases (i.e., lone-pair sources) to give stable adducts. Any appropriate hydrocarbon tail group can be used herein (e.g., alkane hydrocarbon).

The hydrocarbon tail group may include from 4 to 10 carbon atoms. The hydrocarbon tail group may include from 4 to 8 carbon atoms or from 4 to 6 carbon atoms. The hydrocarbon tail group can be an alkyl group or an aryl group. The alkyl group may be straight or branched. The alkyl chain of the at least one cathode additive may be diakyl, isoakyl, alkene, or any combination thereof. The hydrocarbon tail group may be a fluorocarbon group, such as a perfluoroalkyl group. The hydrocarbon tail group may be derived from plant or petroleum-based oils.

Electronegativity is the power of an atom, when in a molecule, to attract electrons to itself. (Linus Pauling, "The Nature of the Chemical Bond," Third Edition (1960), p. 88). Pauling electronegativity values can be found in common scientific reference books, such as in M. James and M. P. Lord in *Macmillan's Chemical and Physical Data*, Macmillan, London, U K, 1992; Pauling electronegativity values discussed herein are based upon this reference. The primary atom of the head group may be an atom having a Pauling electronegativity value of from 2 to 4. Atoms having a Pauling electronegativity value of from 2 to 4 can be selected from the group consisting of B, N, P, S, Cl, As, Se, Br, Te, I, Po, At, Ru, Rh, Pd, Os, Ir, Pt, Ag, and Au. Alternatively, they can be selected from the group consisting of B, N, P, S, Cl, Se, Br, or I.

The chemical bond between the primary atom of the Lewis acid head group and the closest backbone atom of the tail group is non-hydrolysable in concentrated alkali solution. This bond, which is a dipolar bond (also known as a dative covalent bond, or coordinate bond), is a kind of 2-center, 2-electron covalent bond in which the two electrons derive from the same atom. A dipolar bond is formed when a Lewis base (in this case, from the tail group) donates a pair of electrons to a Lewis acid (the head group). In contrast, each atom of a standard covalent bond contributes one electron.

The at least one cathode additive may be a boronic acid. The boronic acid may be, for example, represented by Structure (1) below. Structure (1) includes a Lewis acid head group containing boron (B) and a hydrocarbon tail group R that may be a linear or branched alkyl or aryl chain having from 4 to 8 carbon atoms. The boron may be bonded with two hydroxyl (OH) compounds. The boron-oxygen head group of Structure (1) is also an example of at least one p-element atom (boron) that is bonded to a second p-element atom (oxygen). The electronegativity of the at least one p-element atom (boron) is different than the electronegativity of the second p-element atom (oxygen). Non-limiting examples of the boronic acid include butyl boronic acid, pentyl boronic acid, hexyl boronic acid, and isobutyl boronic acid.

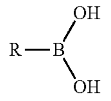

(1)

The at least one cathode additive may be an amine oxide. The amine oxide may be, for example, represented by Structure (2) below. Structure (2) includes a nitrogen (N) atom that is bonded with hydrogen atoms R1 and R3 and a hydrocarbon tail group R2 that may be a linear or branched alkyl or aryl chain having from 4 to 10 carbon atoms. The nitrogen-oxygen head group of Structure (2) is also an example of at least one p-element atom (nitrogen) that is bonded to a second p-element atom (oxygen). The electronegativity of the at least one p-element atom (nitrogent) is different than the electronegativity of the second p-element atom (boron). A non-limiting example of the amine oxide includes octyl dimethyl amine oxide and N,N-dimethylnonan-1-amine oxide.

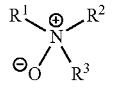

(2)

The at least one cathode additive may be a phosphine oxide. The phosphine oxide may be, for example, represented by Structure (3) below. Structure (3) includes a phosphorus (P) atom that is bonded with an oxygen (O) atom; hydrogen atoms R1 and R3; and a hydrocarbon tail group R2 that may be a linear or branched alkyl or aryl chain having from 4 to 10 carbon atoms. The phosphorus-oxygen head group of Structure (3) is also an example of at least one p-element atom (phosphorus) that is bonded to a second p-element atom (oxygen). The electronegativity of the at least one p-element atom (phosphorus) is different than the electronegativity of the second p-element atom (boron). Non-limiting examples of the phosphine oxide include hexyldimethylphosphine oxide, octyldimethylphosphine oxide, and decyldimethylphosphine oxide.

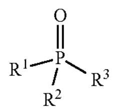

(3)

The at least one cathode additive may be a sulfonic acid. The sulfonic acid may be, for example, represented by Structure (4) below. Structure (4) includes a sulfur (S) atom that is bonded with two oxygen (O) atoms; a hydroxyl (OH)

compound; and a hydrocarbon tail group R that may be a linear or branched alkyl or aryl chain having from 4 to 10 carbon atoms. The S(═O)$_2$OH group is a sulfonyl hydroxide. The sulfur-oxygen head group of Structure (4) is also an example of at least one p-element atom (sulfur) that is bonded to a second p-element atom (oxygen). The electronegativity of the at least one p-element atom (sulfur) is different than the electronegativity of the second p-element atom (oxygen). Non-limiting examples of the sulfonic acid include octyl sulfonic acid and decyl sulfonic acid.

(4)

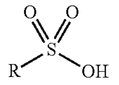

The at least one cathode additive may be a sulfoxide. The sulfoxide may be, for example, represented by Structure (5) below. Structure (5) includes a sulfur (S) atom that is bonded to an oxygen (O) atom and hydrocarbon tail groups R and R' that may be linear or branched alkyl or aryl chains having from 4 to 10 carbon atoms. The S═O group is a sulfinyl oxide. The sulfur-oxygen head group of Structure (5) is also an example of at least one p-element atom (sulfur) that is bonded to a second p-element atom (oxygen). The electronegativity of the at least one p-element atom (sulfur) is different than the electronegativity of the second p-element atom (oxygen). Non-limiting examples of the sulfoxide include butylmethylsulfoxide, dibutylsulfoxide, and methylpentylsulfoxide.

(5)

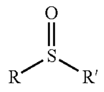

The at least one cathode additive may be a sulfone. The sulfone may be, for example, represented by Structure (6) below. Structure (6) includes a sulfur (S) atom that is bonded to two oxygen (O) atoms and hydrocarbon tail groups R and R' linear or branched alkyl or aryl chains having from 4 to 10 carbon atoms. The sulfur-oxygen head group of Structure (6) is also an example of at least one p-element atom (sulfur) that is bonded to a second p-element atom (oxygen). The electronegativity of the at least one p-element atom (sulfur) is different than the electronegativity of the second p-element atom (oxygen). Non-limiting examples of the sulfone include butylmethylsulfone, dibutylsulfone, and methylpentylsulfone.

(6)

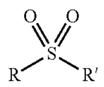

The at least one cathode additive may be a sultaine. The sultaine may be, for example, represented by Structure (7) below. Structure (7) includes a sulfur (S) atom that is bonded to three oxygen (O) atoms and a hydrocarbon tail group R' that may be a linear or a branched alkyl or aryl chains having from 4 to 10 carbon atoms. Structure (7) also includes a nitrogen (N) atom bonded to a hydrocarbon tail group R1 that may be a linear or a branched alkyl or a aryl chain having from 4 to 10 carbon atoms. The sulfur-oxygen head group of Structure (7) is also an example of at least one p-element atom (sulfur) that is bonded to a second p-element atom (oxygen). The electronegativity of the at least one p-element atom (sulfur) is different than the electronegativity of the second p-element atom (oxygen). A non-limiting example of the sultaine includes alkyl hydroxylpropyl sultaine.

(7)

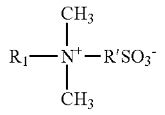

The at least one cathode additive may be a carboxylic acid. The carboxylic acid may be, for example, represented by Structure (8) below. Structure (8) includes a carbon (C) atom that is bonded with an oxygen (O) atom; a hydroxyl (OH) compound; and a hydrocarbon tail group R that may be a monovalent functional group. The carbon-oxygen head group of Structure (8) is also an example of at least one p-element atom (carbon) that is bonded to a second p-element atom (oxygen). The electronegativity of the at least one p-element atom (carbon) is different than the electronegativity of the second p-element atom (oxygen). Non-limiting examples of the carboxylic acid include hexylcarboxylic acid and octylcarboxylic acid.

(8)

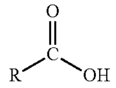

A mixture of two or more cathode additives may also be included within cathode 12. The weight ratio of two cathode additives may be, for example, 1-to-1, 2-to-1, or 3-to-1. For example, octyl dimethyl amine oxide and boronic acid may both be added to the cathode 12. The weight ratio of octyl dimethyl amine oxide to boronic acid may be, for example, 3-to-1.

The battery designer, taking the volumetric constraints, such as void volume, into consideration, attempts to maximize the amount of electrochemically active materials, or materials that actively contribute to the electrochemical reactions, within the battery 10. The at least one cathode additive will occupy volume available for active materials within the housing of the battery. The amount of the at least one cathode additive that is used within the cathode 12 must be sufficient to provide the synergistic benefits to the battery 10 after battery assembly or upon discharge. The cathode additive cannot, however, be included at levels within the cathode 12 that detrimentally impact the inclusion of active materials, such as manganese dioxide. With the design considerations taken into account, the cathode additive may have a concentration of less than about 0.15 weight percent of the weight of the cathode 12. For example, the concentration of the at least one cathode additive may be from about 0.01 weight percent of the weight of the cathode 12 to about 0.12 weight percent of the weight of the cathode 12. The concentration of the at least one cathode additive may be from about 0.04 weight percent of the weight of the cathode 12 to about 0.06 weight percent of the weight of the cathode 12.

As is discussed above, the cathode 12 may be a porous structure that may include cathode active material(s), cathode conductive aid(s), and binder. The electrolyte must be able to effectively penetrate the porous structure of the cathode 12 in order for the battery to effectively discharge. The electrolyte must contact the solid components of the cathode 12 and form a solid/liquid boundary. A factor that may affect the ability of the electrolyte to effectively penetrate the porous structure of the cathode 12 is the surface tension of the electrolyte. An electrolyte having a surface tension that is too high, for example greater than about 70 mN/m, may not be able to sufficiently penetrate the porous structure of the cathode 12 to lead to efficient discharge of the electrochemically active cathode material(s). The ability of an electrolyte to diffuse within the porous structure of the cathode 12 may be referred to as wettability. A porous structure of a cathode that does not easily facilitate electrolyte movement into the cathode structure is said to have poor wettability. Conversely, a porous structure that easily facilitates electrolyte movement into the cathode structure is said to be wettable.

Without wishing to be bound by theory, the cathode additive that is incorporated within the cathode 12 may lower the surface tension of the electrolyte under various battery discharge conditions, and various states of battery discharge, as the electrolyte diffuses within the porous structure of the cathode 12. It is useful to discuss the reactions that occurs within primary alkaline battery to further illustrate this point.

The electrochemically active cathode material undergoes a reduction reaction. For example, manganese dioxide ($MnO_2$) may be at least one of the electrochemically active materials within the cathode 12. The manganese dioxide may undergo a series of two reduction reactions during discharge of the battery 10. The cathode reduction reactions may be represented by Reactions I and II below. Although the manganese dioxide is shown as $MnO_2$ in Reaction I, as is conventional, it is well understood by those skilled in the art that manganese dioxide is non-stoichiometric, and the actual chemical formula for manganese dioxide is, for example, approximately $MnO_{1.96}$. Accordingly, the actual number of electrons involved in this reaction is approximately 0.92. Reaction I is commonly referred to the 1-electron discharge step. Reaction II is commonly referred to as the $2^{nd}$-electron discharge step.

$$MnO_2 + H_2O + e \longrightarrow MnOOH + OH^- \quad \text{(I)}$$

$$3MnOOH + e \longrightarrow Mn_3O_4 + OH^- + H_2O \quad \text{(II)}$$

Reaction I usually occurs during the initial stages of battery discharge. Reaction II usually occurs when the battery 10 has been discharged to a significant degree as evidenced by a corresponding low open circuit voltage of the battery 10. Reaction II has relatively low contribution to the overall discharge capacity of the battery 10 as compared to Reaction I.

The electrochemically active anode material undergoes an oxidation reaction. For example, zinc may be at least one of the electrochemically active materials within the anode 14. The zinc may undergo a series of three anode reactions during discharge of the battery 10. The anode reactions may be represented by Reactions III, IV, and V below.

$$Zn + 4OH^- \longrightarrow Zn(OH)_4^{2-} + 2e \quad \text{(III)}$$

$$Zn + 2OH^- \longrightarrow Zn(OH)_2 + 2e \quad \text{(IV)}$$

$$Zn(OH)_2 \longrightarrow ZnO + H_2O \quad \text{(V)}$$

Reaction III usually occurs during the initial stages of discharge. As the battery 10 discharges, the electrolyte within the anode 14 of the battery 10 will become saturated with the zincate $[Zn(OH)_4^{2-}]$ that is being produced by Reaction III. Reaction IV will begin around or about the point of zincate saturation within the electrolyte. As the battery 10 continues to discharge, the water available within the anode 14 will become depleted. Reaction V will begin around or about the point of water depletion. As a result, the zinc hydroxide $[Zn(OH)_2]$ will dehydrate to zinc oxide (ZnO).

Per Reaction I, the reduction of the manganese dioxide consumes water ($H_2O$). The source of water is the electrolyte within the battery 10. A release of hydroxyl ions ($OH^-$) will result from the reduction reaction. The hydroxyl ions will diffuse to the anode 14 as the concentration of hydroxyl ions within the cathode 12 increases. The hydroxyl ions will react with the zinc (Zn) in the anode 14 via Reaction III or Reaction IV to form either zincate $[Zn(OH)_4^{2-}]$ or zinc hydroxide $[Zn(OH)_2]$.

The overall reactions occurring within the battery 10 will depend upon whether the 1-electron discharge step or $2^{nd}$-electron step discharge is occurring within the cathode 12. During the 1-electron discharge step, the overall reaction may be represented by Reaction VI below. During the $2^{nd}$-electron discharge step, the overall reaction may be represented by Reaction VII below.

$$2MnO_2 + Zn + 2H_2O \longrightarrow 2MnOOH + Zn(OH)_2 \quad \text{(VI)}$$

$$3MnO_2 + 2Zn \longrightarrow Mn_3O_4 + 2ZnO \quad \text{(VII)}$$

It can be seen from Reactions I and VI that there must be sufficient amount of water to be present to allow the overall reaction to occur. The aqueous alkaline electrolyte is the source of water within the battery 10 prior to discharge. The concentration of the hydroxide within the electrolyte prior to discharge must be sufficient to support Reactions I and VI. In addition, the concentration of the hydroxide within the electrolyte will change with the discharge of the battery 10. The mass transfer of the electrolyte within, for example, the porous structure of the cathode 12 is dynamic and is dependent upon various factors including, for example, the discharge rate of the battery 10.

The electrolyte must be in contact with the manganese dioxide of the cathode 12 in order for the hydroxyl ions that are produced during discharge of the cathode 12 to enter the electrolyte solution; to generate the concentration gradient; and to diffuse and migrate to the anode 14 of the battery 10. Prior to discharge, the surface tension of the electrolyte may be such that the electrolyte can effectively penetrate the porous structure of the cathode 12. The surface tension of the electrolyte, however, may change during discharge of the battery 10. The change in water content or hydroxyl ion concentration during discharge may, for example, increase the surface tension of the electrolyte. The electrolyte may have, for example, difficulty in moving through the porous structure of the cathode 12. The surface of the electrochemically active cathode material may not be sufficiently wet. The ability of the hydroxyl ions to diffuse and/or migrate within the electrolyte to the anode 14 may, for example, be reduced. A poorer performing battery 10 under discharge will result.

The at least one cathode additive may be soluble within the electrolyte, for example strong alkaline electrolytes such as aqueous potassium hydroxide. An at least one cathode additive that is highly soluble within the electrolyte may be able to rapidly dissolve into the electrolyte as the electrolyte comes in contact with the solid components of the cathode 12. As a result, the surface tension of the electrolyte may be lowered more quickly; the electrolyte may wet the cathode solids more rapidly and effectively; and increased discharge performance may result. The at least one cathode additive may be stable in the presence of oxidants, such as EMD and other electrochemically active cathode materials, within alkaline solutions. A stable additive in the presence of an oxidizer within a strongly alkaline solution may retain its ability to lower surface tension of the electrolyte over a longer period of time.

The dynamic surface tension of a liquid, such as an aqueous potassium hydroxide electrolyte, may be determined by using a tensiometer. The tensiometer may measure the dynamic surface tension of the liquid according to the bubble pressure method. The bubble pressure method includes injecting a gas, such as air, into a liquid that is to be analyzed. The gas enters the liquid through a capillary that is immersed within the liquid. The difference in pressure between the gas and the liquid is recorded at several gas flow rates. The difference in pressure for each flow rate that is required to form a bubble is proportional to the surface tension of the liquid by the Young-Laplace equation, as reproduced below:

$$\sigma = \frac{\Delta p \cdot d}{4}$$

where Δp is the pressure differential between the pressure inside the gas bubble and the pressure outside the gas bubble within the liquid in newtons per square meter ($N/m^2$); d is the diameter of the capillary in meters (m); and σ is the surface tension of the liquid in newtons per meter (N/m). The dynamic surface tension of the liquid is calculated for each gas flow rate using the Young-Laplace equation for each flow rate. The bubble lifetime is equal to the time elapsed between the formation of each bubble and is recorded for each flow rate. The calculated dynamic surface tension values are plotted versus the bubble lifetime.

The method of measuring the dynamic surface tension of a liquid may generally include the steps of: (1) calibrating the tensiometer; (2) cleaning the capillary of the tensiometer; and (3) measuring the dynamic surface tension and bubble lifetime of the liquid with the tensiometer. The method of measuring the dynamic surface tension of a liquid with a tensiometer may, for example, generally follow American Society for Testing and Materials standard ASTM D3825-09.

A SITA science line t60 tensiometer, available from SITA Messetechnik GmbH (Dresden, Germany), may be used to measure the dynamic surface tension of a liquid, such as an electrolyte solution. The t60 tensiometer may be calibrated according to SITA Messetechnik instructions with the tensiometer in Calibration Mode. See *SITA science line t60 Manual*, p. 4, Section 12.1. The calibration is completed by placing the tip of the capillary tube of the tensiometer into about 25 mL of deionized (DI) water that is held within a glass vessel, such as a 50 mL beaker. The tip of the capillary tube should extend into the solution to the manufacturer's recommended depth that is signaled by a mark on the temperature probe of the tensiometer. The temperature of the DI water should be between about 20° C. and about 30° C.

The t60 tensiometer may then be cleaned according to SITA Messetechnik instructions with the tensiometer in Cleaning Mode. See Id., p. 20, Section 12.4. The capillary tube may first be rinsed with DI water. The cleaning is completed by placing the tip of the capillary tube of the tensiometer into about 25 mL of deionized (DI) water that is held within a glass vessel, such as a 50 mL beaker. The tip of the capillary tube should extend into the solution to the manufacturer's recommended depth that is signaled by a mark on the temperature probe of the tensiometer. The temperature of the DI water should be between about 20° C. and about 30° C. Air is rapidly bubbled through the capillary tube of the tensiometer for about two (2) minutes.

The t60 tensiometer may then be used to obtain dynamic surface tension of the liquid solution to be analyzed. The data may be obtained according to SITA Messetechnik instructions with the tensiometer in Auto-Messetechnik Mode. See Id., p. 18, Section 12.3. The auto-measurement is completed by placing the tip of the capillary tube of the tensiometer into about 25 mL of the liquid solution that is held within a glass vessel, such as a 50 mL beaker. The tip of the capillary tube should extend into the solution to the manufacturer's recommended depth that is signaled by a mark on the temperature probe of the tensiometer. The temperature of the solution being analyzed should be between about 20° C. and about 30° C. The Auto-Measurement may cover a bubble lifetime range from about thirty (30) milliseconds to about ten (10) seconds. The dynamic surface tension of the liquid solution being analyzed over the range of bubble lifetimes may then be recorded.

The dynamic surface tension of electrolyte solutions may be measured according to the method described above. The dynamic surface tension of an electrolyte, such as aqueous potassium hydroxide, may be, for example, from about 80 mN/m to about 95 mN/m at a bubble lifetime of about 10 seconds. The at least one cathode additive may reduce the surface tension of the electrolyte to less than about 35 mN/m at a bubble lifetime of approximately 10 seconds. For example, the at least one cathode additive may reduce the surface tension of electrolyte to from about 10 mN/m to about 28 mN/m, for example about 25 mN/m. The at least one cathode additive that reduces the surface tension of the electrolyte within 10 seconds of bubble time may improve battery performance under medium-rate and low-rate discharge tests. The at least one cathode additive may lower the surface tension of the electrolyte prior to and during discharge.

The surface tension of an electrolyte, such as aqueous potassium hydroxide, may be, for example, from about 80 mN/m to about 95 mN/m at a bubble lifetime of about 0.1 seconds. The at least one cathode additive may reduce the surface tension of the electrolyte to less than about 40 mN/m at a bubble lifetime of approximately 0.1 seconds. For example, the at least one cathode additive may reduce the surface tension of electrolyte to from about 10 mN/m to about 47 mN/m, for example about 40 mN/m. The at least one cathode additive that reduces the surface tension of the electrolyte within 0.1 seconds of bubble time may improve battery performance under high-rate, medium-rate, and low-rate discharge tests. Without wishing to be bound by theory, the ability of the cathode additive to lower surface tension of the electrolyte within a shorter period of time, e.g., a shorter bubble lifetime, may enable a relatively quick reduction in surface tension of the electrolyte and subsequently more rapid mass transfer of the electrolyte into the porous structure of the cathode 12 during discharge.

The separator 16 comprises a material that is wettable or wetted by the electrolyte. A material is said to be wetted by a liquid when the contact angle between the liquid and the surface is less than 90° or when the liquid tends to spread spontaneously across the surface; both conditions normally coexist. Separator 16 may comprise woven or nonwoven paper or fabric. Separator 16 may include a layer of, for example, cellophane combined with a layer of non-woven material. Separator 16 also can include an additional layer of non-woven material. Separator 16 may also be formed in situ within the battery 10. U.S. Pat. No. 6,514,637, for example, discloses such separator materials, and potentially suitable methods of their application. The separator material may be thin. Separator 16, for example, may have a dry material thickness of less than 250 micrometers (microns). Separator 16, for example, may have a dry material thickness of less than 100 microns. Separator 16 preferably has a dry material thickness from about 70 microns to about 90 microns, more preferably from about 70 microns to about 75 microns. Separator 16 has a basis weight of 40 $g/m^2$ or less. Separator 16 preferably has a basis weight from about, 15 $g/m^2$ to about 40 $g/m^2$, and more preferably from about 20 $g/m^2$ to about 30 $g/m^2$. Separator 16 may have an air permeability value. Separator 16 may have an air permeability value as defined in International Organization for Standardization (ISO) Standard 2965. The air permeability value of Separator 16 may be from about 2000 $cm^3/cm^2 \cdot min$ @ 1 kPa to about 5000 $cm^3/cm^2 \cdot min$ @ 1 kPa. The air permeability value of the separator 16 may be from about 3000 $cm^3/cm^2 \cdot min$ @ 1 kPa to about about 4000 $cm^3/cm^2 \cdot min$ @ 1 kPa. The air permeability value of the separator 16 may be from about 3500 $cm^3/cm^2 \cdot min$ @ 1 kPa to about 3800 $cm^3/cm^2 \cdot min$ @ 1 kPa.

The current collector 20 may be made into any suitable shape for the particular battery design by any known methods within the art. The current collector 20 may have, for example, a nail-like shape. The current collector 20 may have a columnar body and a head located at one end of the columnar body. The current collector 20 may be made of metal, e.g., zinc, copper, brass, silver, or any other suitable material. The current collector 20 may be optionally plated with tin, zinc, bismuth, indium, or another suitable material presenting a low electrical-contact resistance between the current collector 20 and, for example, the anode 14 and an ability to suppress gas formation.

The seal 22 may be prepared by injection molding a polymer, such as polyamide, polypropylene, polyetherurethane, or the like; a polymer composite; and mixtures thereof into a shape with predetermined dimensions. The seal 22 may be made from, for example, Nylon 6,6; Nylon 6, 10; Nylon 6, 12; polypropylene; polyetherurethane; co-polymers; and composites and mixtures thereof. Exemplary injection molding methods include both the cold runner method and the hot runner method. The seal 22 may contain other known functional materials such as a plasticizer, crystalline nucleating agent, antioxidant, mold release agent, lubricant, and antistatic agent. The seal 22 may also be coated with a sealant. The seal 22 may be moisturized prior to use within the battery 10. The seal 22, for example, may have a moisture content of from about 1.0 weight percent to about 9.0 weight percent depending upon the seal material. The current collector 20 may be inserted into and through the seal 22.

The end cap 24 may be formed in any shape sufficient to close the respective battery. The end cap 24 may have, for example, a cylindrical or prismatic shape. The end cap 24 may be formed by pressing a material into the desired shape with suitable dimensions. The end cap 24 may be made from any suitable material that will conduct electrons during the discharge of the battery 10. The end cap 24 may be made from, for example, nickel-plated steel or tin-plated steel. The end cap 24 may be electrically connected to the current collector 20. The end cap 24 may, for example, make electrical connection to the current collector 20 by being welded to the current collector 20. The end cap 24 may also include one or more apertures (not shown), such as holes, for venting any gas pressure that may build up under the end cap 24 during a gassing event within the battery 10, for example, during deep discharge or reversal of a battery within a device, that may lead to rupture of vent.

The sealed battery 10 will have a fixed internal volume. The cathode 12, the anode 14, the separator 16, the electrolyte, the current collector 20, and the seal 22 will occupy a significant portion of the internal volume of the battery 10 after the battery 10 is sealed. The total internal volume of the battery 10 cannot, however, be occupied by these materials. The products of the cathode and anode half-cell reactions, for example Reaction I and Reactions III, IV, and V, may occupy more volume than the reactants of the respective reactions. For example, zinc oxide (ZnO) has a density of 5.607 $g/cm^3$ while zinc has a density of 7.14 $g/cm^3$. Thus, one gram of zinc oxide occupies approximately 27% more space than 1 gram of zinc. The battery designer may typically determine the volume occupied by the reactants prior to discharge and the products after complete discharge to determine the volume change. The battery designer may typically select some unoccupied volume within the battery 10, referred to as the void volume, after discharge. The unoccupied volume may, inter alia, lower the internal stress exerted on the battery 10 after discharge and help mitigate post-discharge leakage and/or the potential for the battery to become lodged within a cavity within a device.

Figure 2:
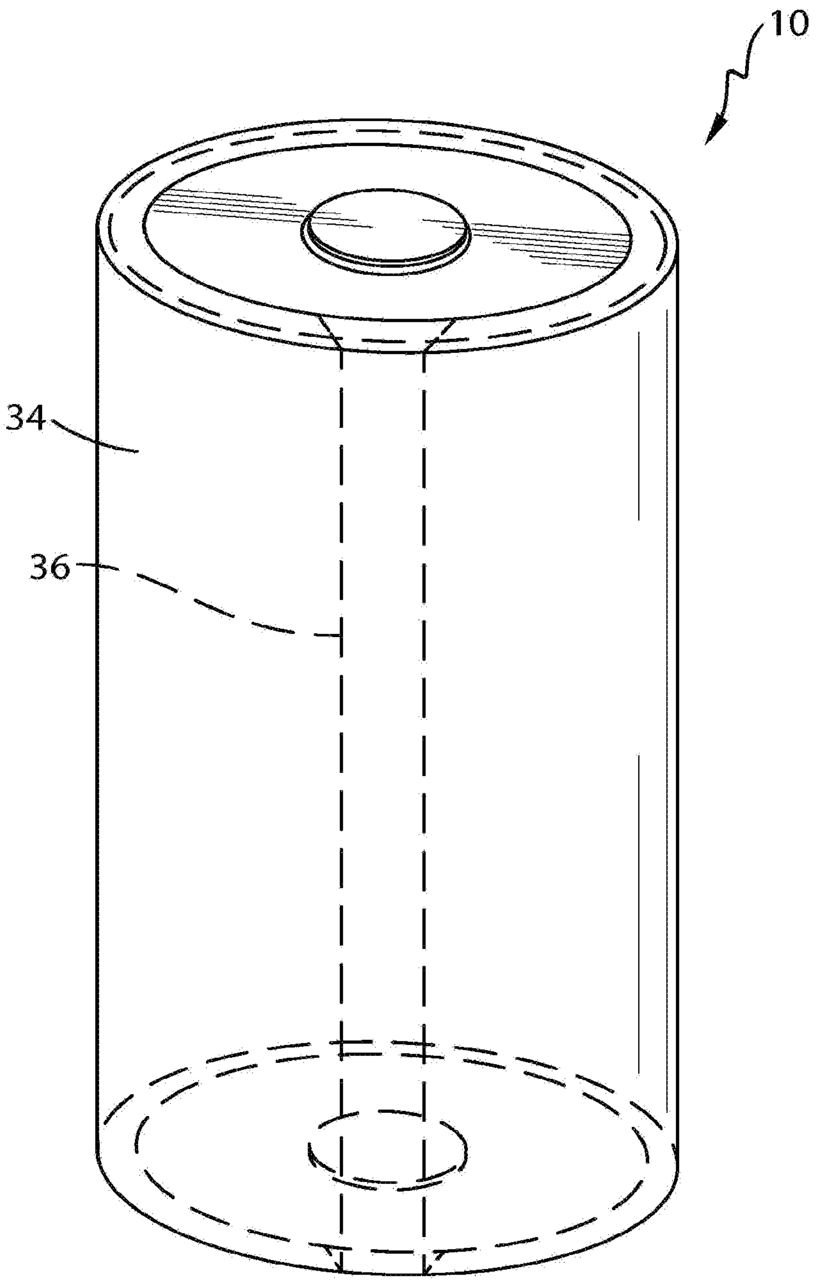
FIG. 2 is a perspective view of a primary alkaline battery of the present invention including a voltage indicator.

Referring now to FIG. 2, there is shown a battery 10 including a label 34 that has an indicator, or tester, 36 incorporated within the label to determine, for example, the voltage, capacity, state of charge, and/or power of the battery 10. The label 34 may be a laminated multi-layer film with a transparent or translucent layer bearing the label graphics and text. The label 34 may be made from polyvinyl chloride (PVC), polyethylene terephthalate (PET), and other similar polymer materials. The tester 36 may include, for example, a thermochromic or an electrochromic indicator. In a thermochromic battery tester, the indicator may be placed in electrical contact with the housing and the end cap of the battery. The consumer activates the indicator by manually depressing a switch located within an electrical circuit included within the thermochromic tester. Once the switch is depressed, the consumer has connected an anode of the battery, via the end cap, to a cathode of the battery, via the housing, through the thermochromic tester. The thermochromic tester may include a silver conductor that has a variable width so that the resistance of the conductor also varies along its length. The current generates heat that changes the color of a thermochromic ink display that is over the silver conductor as the current travels through the silver conductor. The thermochromic ink display may be arranged as a gauge to indicate, for example, the relative capacity of the battery. The higher the current the more heat is generated and the more the gauge will change to indicate that the battery is good.

Experimental Testing

Performance Testing of Assembled AA Alkaline Primary Batteries

A conventional battery, referred to as Control in Table 1 below, is assembled to compare the effects of the present invention on battery discharge performance. The battery includes an anode. The anode includes 4.85 grams of zinc; 0.027 grams of polyacrylic acid gelling agent; and 0.006 grams of corrosion inhibitor. The battery includes a cathode. The cathode includes 10.90 grams of EMD and 0.401 grams TIMCAL BNB-90 graphite. A separator is interposed between the anode and cathode. The anode, cathode, and separator are inserted in a cylindrical, AA-size housing. An aqueous alkaline potassium hydroxide (KOH) electrolyte with zinc oxide (ZnO) additive is dispersed throughout the anode, the cathode, and the separator within the housing. The total KOH weight of the electrolyte is 1.107 grams. The total water weight of the electrolyte is 2.450 grams. The total ZnO weight of the electrolyte is 0.054 grams. The housing is then sealed to complete the battery assembly process.

An exemplary battery, referred to as Battery A in Table 1 below, is assembled to compare the effects of the present invention on battery discharge performance. The battery includes an anode. The anode includes 4.86 grams of zinc; 0.027 grams of polyacrylic acid gelling agent; and 0.005 grams of corrosion inhibitor. The battery includes a cathode. The cathode includes 0.008 grams of boronic acid having four carbon atoms (BA4) cathode additive, 10.93 grams of EMD, and 0.400 grams TIMCAL BNB-90 graphite. A separator is interposed between the anode and cathode. The anode, cathode, and separator are inserted in a cylindrical, AA-size housing. An aqueous alkaline potassium hydroxide (KOH) electrolyte with zinc oxide (ZnO) additive is dispersed throughout the anode, the cathode, and the separator within the housing. The total KOH weight of the electrolyte is 1.108 grams. The total water weight of the electrolyte is 2.447 grams. The total ZnO weight of the electrolyte is 0.053 grams. The housing is then sealed to complete the battery assembly process.

An exemplary battery, referred to as Battery B in Table 1 below, is assembled to compare the effects of the present invention on battery discharge performance. The battery includes an anode. The anode includes 4.84 grams of zinc; 0.026 grams of polyacrylic acid gelling agent; and 0.005 grams of corrosion inhibitor. The battery includes a cathode. The cathode includes 0.008 grams of N,N-dimethylnonan-1-amine oxide having eight carbon atoms (AO8) cathode additive, 10.97 grams of EMD, and 0.405 grams TIMCAL BNB-90 graphite. A separator is interposed between the anode and cathode. The anode, cathode, and separator are inserted in a cylindrical, AA-size housing. An aqueous alkaline potassium hydroxide (KOH) electrolyte with zinc oxide (ZnO) additive is dispersed throughout the anode, the cathode, and the separator within the housing. The total KOH weight of the electrolyte is 1.105 grams. The total water weight of the electrolyte is 2.445 grams. The total ZnO weight of the electrolyte is 0.053 grams. The housing is then sealed to complete the battery assembly process.

TABLE 1

The design features of Battery A, Battery B, and Control.

| FEATURE | BATTERY A | BATTERY B | CONTROL |
|---|---|---|---|
| Anode | | | |
| Zinc Weight | 4.86 g | 4.84 g | 4.85 g |
| Gelling Agent Weight | 0.027 g | 0.026 g | 0.027 g |
| Corrosion Inhibitor Weight | 0.005 g | 0.005 g | 0.006 g |
| Cathode | | | |
| EMD Weight | 10.93 g | 10.97 g | 10.90 g |
| Graphite Weight | 0.400 g | 0.405 g | 0.401 g |
| Cathode Additive | BA4 | AO8 | None |
| Cathode Additive Weight | 0.008 g | 0.008 g | None |
| Complete Cell | | | |
| Total KOH Weight | 1.108 g | 1.105 g | 1.107 g |
| Total Water Weight | 2.447 g | 2.445 g | 2.450 g |
| Total ZnO Weight | 0.053 g | 0.053 g | 0.054 g |

Performance testing includes discharge performance testing that may be referred to as the ANSI/IEC Motorized Toys Test (Toy Test). The Toy Test protocol includes applying a constant load of 3.9 Ohms for 1 hour. The battery then rests for a period of 23 hours. This cycle is repeated until the cutoff voltage of 0.8 volts is reached. The service hours achieved is then reported. The Toy Test is a medium rate discharge test.

Performance testing also includes discharge performance testing that may be referred to as the ANSUIEC CD Player & Electronic Game Test (CD Player Test). The CD Player Test protocol includes applying a constant load of 0.25 Amps for 1 hour to the battery and then the battery rests for a period of 23 hours. The cycle is repeated until the cutoff voltage of 0.9 volts is reached. The service hours achieved is then reported. The CD Player Test is a medium rate discharge test.

Performance testing also includes discharge performance testing that may be referred to as the ANSI/IEC Audio Test (Audio Test). The Audio Test protocol includes applying a constant load of 0.100 Amps for 1 hour and then the battery rests for a period of 23 hours. The cycle is repeated until the cutoff voltage of 0.9 volts is reached. The service hours achieved is then reported. The Audio Test is a low rate discharge test.

Performance testing also includes discharge performance testing that may be referred to as the ANSI/IEC Digital Camera Test (DigiCam). The DigiCam Test protocol includes applying a 30 second pulse to the battery that includes a constant load of 1500 mW for 2 seconds followed immediately by 650 mW for 28 seconds. The discharge cycle is repeated for 5 minutes, and then the battery rests for 55 minutes. The complete cycle is repeated until the cutoff voltage of 1.05 volts is reached. The total number of pulses achieved is then reported. The DigiCam Test is a high rate discharge test.

Before the discharge performance testing, the battery is exposed to a temperature conditioning regime. Under the temperature conditioning regime, the battery is exposed to varying temperature over the course of 14 days. The battery is exposed to what may be referred to as one cycle over the course of a single 24 hour period. A cycle consists of exposing the battery to temperatures that are ramped down from about 28° C. to about 25° C. over the course of six and one half (6.5) hours. The battery is then exposed to temperatures that are ramped up from about 25° C. to about 34°

C. over the course of four and one half (4.5) hours. The battery is then exposed to temperatures that are ramped up from about 34° C. to about 43° C. over the course of two (2) hours. The battery is then exposed to temperatures that are ramped up from about 43° C. to about 48° C. over the course of one (1) hour. The battery is then exposed to temperatures that are ramped up from about 48° C. to about 55° C. over the course of one (1) hour. The battery is then exposed to temperatures that are ramped down from about 55° C. to about 48° C. over the course of one (1) hour. The battery is then exposed to temperatures that are ramped down from about 48° C. to about 43° C. over the course of one (1) hour. The battery is then exposed to temperatures that are ramped down from about 43° C. to about 32° C. over the course of three (3) hours. The battery is finally exposed to temperatures that are ramped down from about 32° C. to about 28° C. over the course of four (4) hours. The cycle is repeated over the course of 14 days and then the battery undergoes discharge performance testing that is described above.

Performance Testing Results

Battery A, Battery B, and Control all undergo Toy, CD Player, Audio, and DigiCam performance testing. Table 2 below summarizes the performance testing results. The % Difference column of Table 2 includes the percentage difference in performance from Battery A, or Battery B, with respect to Control.

Battery A including BA4 cathode additive provides greater performance on all discharge tests when compared to the performance of Control that is a battery of conventional design. Battery B including AO8 cathode additive provides greater performance on all discharge tests when compared to the performance of Control that is a battery of conventional design. In particular, Battery B shows a significant increase of 14% in DigiCam discharge performance when compared with Control.

TABLE 2

Performance testing results and comparisons for Battery A, Battery B, and Control.

| TEST PROTOCOL | BATTERY A | BATTERY B | CONTROL | % DIFFERENCE |
|---|---|---|---|---|
| Toy (Ser. Hours) | 8.89 | 8.83 | 8.75 | Battery A: 1.6<br>Battery B: 0.91 |
| CD Player (Ser. Hours) | 9.80 | 9.71 | 9.62 | Battery A: 1.9<br>Battery B: 0.94 |
| Audio (Ser. Hours) | 28.8 | 28.9 | 28.4 | Battery A: 1.4<br>Battery B: 1.8 |
| DigiCam (Pulses) | 104 | 116 | 102 | Battery A: 2.0<br>Battery B: 14 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A cathode comprising:
an electrochemically active cathode material;
at least one cathode additive, wherein the at least one cathode additive is a boronic acid, an amine oxide, a phosphine oxide, a sulfoxide, a sulfone, or a sultaine, and the at least one cathode additive comprises at least one hydrocarbon tail group bound to the boron atom of boronic acid, the nitrogen atom of the amine oxide, the phosphorus atom of the phosphine oxide, the sulfur atom of the sulfoxide, the sulfur atom of the sulfone, or the nitrogen atom of the sultaine;
wherein the electrochemically active cathode material comprises a manganese electrochemically active material and a nickel electrochemically active material,
wherein the manganese electrochemically active material is chosen from one or more in the group of manganese oxide, manganese dioxide, electrolytic manganese dioxide (EMD), chemical manganese dioxide (CMD), high power electrolytic manganese dioxide (HP EMD), lambda manganese dioxide, gamma manganese dioxide, beta manganese dioxide, and mixtures thereof; and
the nickel electrochemically active material is chosen from one or more in the group of nickel oxide, nickel oxyhydroxide, cobalt oxyhydroxide-coated nickel oxyhydroxide, delithiated layered lithium nickel oxide, partially delithiated layered nickel oxide, beta-nickel oxyhydroxide, gamma-nickel oxyhydroxide, intergrowths of beta-nickel oxyhydroxide, intergrowths of gamma-nickel oxyhydroxide, intergrowths of beta-nickel oxyhydroxide and gamma-nickel oxyhydroxide, cobalt oxyhydroxide-coated beta-nickel oxyhydroxide, cobalt oxyhydroxide-coated gamma-nickel oxyhydroxide, cobalt oxyhydroxide-coated intergrowths of beta-nickel oxyhydroxide and gamma-nickel oxyhydroxide, and mixtures thereof.

2. The cathode of claim 1, wherein the at least one hydrocarbon tail group comprises from 4 carbon atoms to 10 carbon atoms.

3. The cathode of claim 1, wherein the at least one cathode additive is selected from the group consisting of butyl boronic acid, pentyl boronic acid, hexyl boronic acid, isobutyl boronic acid, octyl dimethyl amine oxide, N, N-dimethylnonan-1-amine oxide, hexyldimethylphosphine oxide, octyldimethylphosphine oxide, decyldimethylphosphine oxide, butylmethylsulfoxide, dibutylsulfoxide, methylpentylsulfoxide, butylmethylsulfone, dibutylsulfone, methylpentylsulfone, alkyl hydroxypropyl sultaine, and mixtures thereof.

4. The cathode of claim 1, wherein the at least one cathode additive is less than about 0.15 weight percent of the cathode.

5. The cathode of claim 1, wherein the at least one cathode additive is from about 0.048 weight percent of the cathode to about 0.065 weight percent of the cathode.

6. The cathode of claim 1, further comprising at least one carbon additive, the at least one carbon additive comprising expanded graphite, natural graphite, graphene, single-walled carbon nanotubes, multi-walled carbon nanotubes, carbon fibers, carbon nanofibers, or mixtures thereof.

7. The cathode of claim 1, wherein the at least one cathode additive is a boronic acid.

8. The cathode of claim 1, wherein the at least one cathode additive is an amine oxide.

9. The cathode of claim 1, wherein the electrochemically active cathode material comprises electrolytic manganese dioxide and a delithiated layered lithium nickel oxide or a partially delithiated layered nickel oxide.

10. A battery comprising:

a housing;

an anode;

a cathode, the cathode comprising:

an electrochemically active cathode material; and, at least one cathode additive, wherein the at least one cathode additive is a boronic acid, an amine oxide, a phosphine oxide, a sulfoxide, a sulfone or a sultaine, and the at least one cathode additive comprises at least one hydrocarbon tail group bound to the boron atom of the boronic acid, the nitrogen atom of the amine oxide, the phosphorus atom of the phosphine oxide, the sulfur atom of the sulfoxide, the sulfur atom of the sulfone, or the nitrogen atom of the sultaine;

a separator between the anode and the cathode; and an electrolyte;

wherein the electrochemically active cathode material comprises a manganese electrochemically active material and a nickel electrochemically active material, wherein the manganese electrochemically active material is chosen from one or more in the group of manganese oxide, manganese dioxide, electrolytic manganese dioxide (EMD), chemical manganese dioxide (CMD), high power electrolytic manganese dioxide (HP EMD), lambda manganese dioxide, gamma manganese dioxide, beta manganese dioxide, and mixtures thereof; and the nickel electrochemically active material is chosen from one or more in the group of nickel oxide, nickel oxyhydroxide, cobalt oxyhydroxide-coated nickel oxyhydroxide, delithiated layered lithium nickel oxide, partially delithiated layered nickel oxide, beta-nickel oxyhydroxide, gamma-nickel oxyhydroxide, intergrowths of beta-nickel oxyhydroxide, intergrowths of gamma-nickel oxyhydroxide, intergrowths of beta-nickel oxyhydroxide and gamma-nickel oxyhydroxide, cobalt oxyhydroxide-coated beta-nickel oxyhydroxide, cobalt oxyhydroxide-coated gamma-nickel oxyhydroxide, cobalt oxyhydroxide-coated intergrowths of beta-nickel oxyhydroxide and gamma-nickel oxyhydroxide, and mixtures thereof.

11. The battery of claim 10, wherein the at least one hydrocarbon tail group comprises from 4 carbon atoms to 10 carbon atoms.

12. The battery of claim 10, wherein the at least one cathode additive is selected from the group consisting of butyl boronic acid, pentyl boronic acid, hexyl boronic acid, isobutyl boronic acid, octyl dimethyl amine oxide, N,N-dimethylnonan-1-amine oxide, hexyldimethylphosphine oxide, octyldimethylphosphine oxide, decyldimethylphosphine oxide, butylmethylsulfoxide, dibutylsulfoxide, methylpentylsulfoxide, butylmethylsulfone, dibutylsulfone, methylpentylsulfone, alkyl hydroxypropyl sultaine, and mixtures thereof.

13. The battery of claim 10, wherein the at least one cathode additive is less than about 0.15 weight percent of the cathode.

14. The battery of claim 10, wherein the at least one cathode additive is from about 0.048 weight percent of the cathode to about 0.065 weight percent of the cathode.

15. The battery of claim 10, further comprising at least one carbon additive, the at least one carbon additive comprising expanded graphite, natural graphite, graphene, single-walled carbon nanotubes, multi-walled carbon nanotubes, carbon fibers, carbon nanofibers, or mixtures thereof.

16. The battery of claim 10, wherein the electrolyte comprises an ionically conductive compound in an aqueous solution, the ionically conductive compound comprising sodium hydroxide, potassium hydroxide, lithium hydroxide, cesium hydroxide, zinc chloride, ammonium chloride, magnesium perchlorate, magnesium bromide, or mixtures thereof.

17. The battery of claim 10, wherein the battery comprises a label affixed to the housing, the label including a voltage tester.

18. The battery of claim 10, wherein the at least one cathode additive is a boronic acid.

19. The battery of claim 10, wherein the at least one cathode additive is an amine oxide.

20. The battery of claim 10, wherein the electrochemically active cathode material comprises electrolytic manganese dioxide and a delithiated layered lithium nickel oxide or a partially delithiated layered nickel oxide.

* * * * *